United States Patent
Kashyap et al.

[11] 4,035,599
[45] July 12, 1977

[54] CONTROL SYSTEM FOR NON-RESONANT MICROWAVE DRYERS

[75] Inventors: Satish C. Kashyap, Hazeldean; Walter Wyslouzil, Ottawa, both of Canada

[73] Assignee: Canadian Patents and Development Limited, Ottawa, Canada

[21] Appl. No.: 660,443

[22] Filed: Feb. 23, 1976

[51] Int. Cl.² .......................................... H05B 9/06
[52] U.S. Cl. .................. 219/10.55 B; 323/20; 328/159
[58] Field of Search ............ 219/10.55 A, 10.55 B, 219/10.55 M, 10.55 R; 323/20; 328/158, 159; 34/4, 39

[56] References Cited
U.S. PATENT DOCUMENTS

| 3,555,693 | 1/1971 | Futer | 219/10.55 A |
| 3,678,594 | 7/1972 | Goerz, Jr. et al. | 219/10.55 A |
| 3,816,804 | 6/1974 | Cardwell, Jr. | 323/20 |
| 3,955,061 | 5/1976 | Roehrman | 219/10.77 |

FOREIGN PATENT DOCUMENTS 902,729  6/1972  Canada ..................... 219/10.55 B Primary Examiner—Arthur T. Grimley
Attorney, Agent, or Firm—Edward Rymek

[57] ABSTRACT

The control system monitors the input power to and the output from the dryer applicator, and varies the input power to the applicator as a function of change in applicator efficiency and input power. The control system may consist of a first and a second circuit. The first circuit receives a signal $P_{in_1}$ from a first monitor and a signal $P_{out_1}$ from a second monitor. These signals are combined into an efficiency signal $\eta_1$ to which a reference efficiency signal $-\eta_o$ is added. An amplifier having a predetermined gain K amplifies the resulting signal to produce $-K(\eta_1-\eta_o)$. The second circuit adds the signals $P_{in_1}$ from the first monitor, $-K(\eta_1-\eta_o)$ from the first circuit and $P_{in_0}$, a signal representative of input power for a reference condition, to produce an output signal $P_{in_1} - [P_{in_0} + K(\eta_1 - \eta_o)]$ which is coupled to the microwave source to control the input power to the applicator. The reference signal $P_{in_0}$ may be generated by a voltage source as a function of transport speed of the load through the applicator.

6 Claims, 4 Drawing Figures

CONTROL SYSTEM FOR NON-RESONANT MICROWAVE DRYERS

This invention is directed to a control system for non-resonant dryers, and in particular to a dryer control system for maintaining the moisture content of a finished product substantially constant.

Microwave heating systems are finding greater acceptance as efficient and economical means for industrial processing. Non-resonant as well as resonant types of microwave applicators are used for various processes. Both types of systems require some type of continuous adjustment to compensate for changes in the properties of the material being processed or in the transport speed. In the case of a non-resonant system, the adjustment may involve changing of input power, whereas in the case of a resonant system it may involve changing of input power as well as tuning parameters. There are various schemes for automatic tuning and matching of resonant systems. Conventional control systems for non-resonant systems adjust the input power level in accordance with the moisture level in the product after processing. With this type of control the input power is changed only after the material has been passed through the microwave applicator, and this causes an inherent delay. In addition, the system necessitates the use of expensive moisture meters.

It is therefore an object of this invention to provide a control system which achieves a substantially constant desired moisture level in a finished product for large variations of moisture content of the product entering the dryer.

It is a further object of this invention to provide a control system which achieves a substantially constant desired moisture level in a finished product for variations of transport speed of the product through the dryer.

These and other objects are achieved in a control system which includes means for monitoring the input power to the dryer applicator and output power from the dryer applicator and circuit means for controlling the input power to the applicator as a function of changes in applicator efficiency and input power. A first circuit receives a signal $P_{in_1}$ from a first monitor which monitors the input power to the applicator and a signal $P_{out_1}$ from a second monitor which monitors the output power from the applicator. These signals are combined into an efficiency signal $\eta_1$ to which a reference efficiency signal $-\eta_0$ is added. An amplifier having a predetermined gain K amplifies the resulting signal to produce $-K(\eta_1-\eta_0)$. A second circuit adds the signals $P_{in_1}$ from the first monitor, $-K(\eta_1-\eta_0)$ from the first circuit and $P_{in_0}$, a signal representative of input power for a reference condition, to produce an output signal $P_{in_1} -[P_{in_0} + K(\eta_1-\eta_0)]$ which is coupled to the microwave source to control the input power to the applicator. The reference signal $P_{in_0}$ may be generated by a voltage source as a function of transport speed of the load through the applicator.

Figure 1:
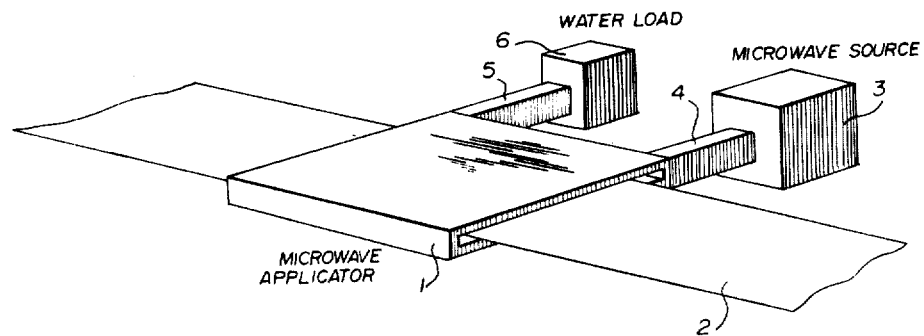
FIG. 1 is a schematic of a typical non-resonant microwave system for processing sheet materials.
Figure 2:
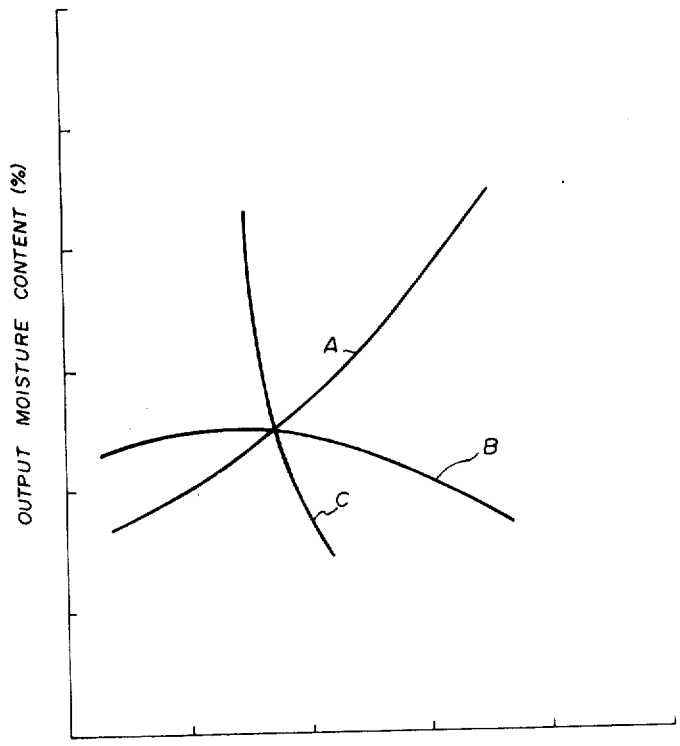
FIG. 2 is a general graph showing output vs input moisture content of a load for constant (A) input power, (B) output power and (C) efficiency.

FIG. 1 shows a typical meander line type of non-resonant microwave dryer for heating thin sheet materials. It includes a meander line microwave applicator 1 through which a sheet or web 2 is transported. A microwave source 3 feeds energy into the applicator 1 via a waveguide 4 and out via a waveguide 5 to a water load 6 where excess power is dumped. The basic well known theoretical relations between power level and attenuation in a non-resonant applicator for sheet materials are given by $$dP/dx\ (x) = -2(\alpha(x) + \alpha_1)\ P(x) \quad (1)$$

$$\alpha(x) = \alpha(0) + C[P(0)e^{-\imath\alpha_1 x} - P(x)] \quad (2)$$

where
$P(x)$ = Power level at a distance $x$ along the applicator
$\alpha(x)$ = Attenuation due to wet sheet material along the applicator
$\alpha_1$ = Fixed attenuation due to the applicator
$C$ = Constant By manipulating these relations, the variations of output moisture content with input moisture content for various conditions are determined. These are shown in FIG. 2. Curves A, B, and C show the relationship between input moisture content and output moisture content for constant input power, constant output power and constant efficiency. As can be seen from FIG. 2, the output moisture content increases with an increase in input moisture content for constant input power (curve A) while the output moisture content decreases with an increase in input moisture content for constant efficiency (curve C). By combining these opposite trends, the output moisture content can be maintained substantially constant through the following relationship:

$$P_{in_1} - P_{in_0} = K(\eta_1 - \eta_0) \quad (3)$$

or by varying the input power $P_{in_1}$ in the following manner:

$$P_{in_1} = P_{in_0} + K(\eta_1 - \eta_0)$$

where
$P_{in_0}, \eta_0$ = input power and efficiency for the reference case
$P_{in_1}, \eta_1$ = Input power and efficiency for the perturbed case
$K$ = a constant.

Figures 3, 4:
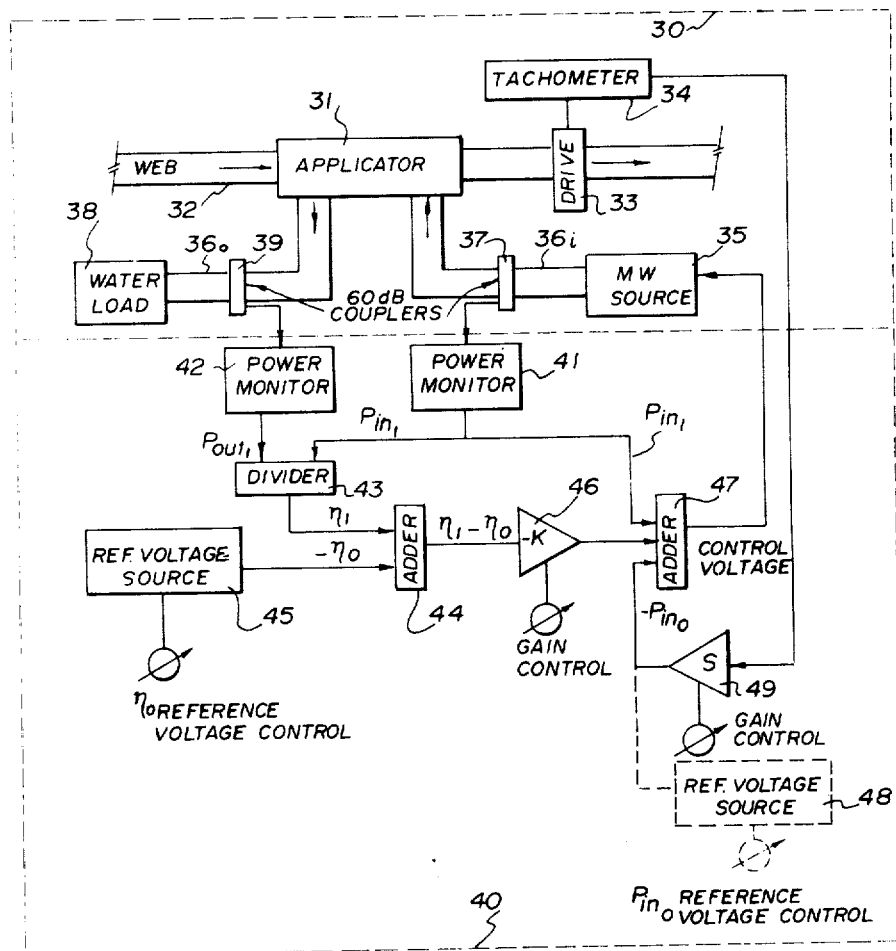
FIG. 3 is a schematic of a control system in accordance with this invention.
FIG. 4 is a graph showing output vs input moisture content of products processed by a dryer controlled in accordance with this invention.

FIG. 3 illustrates a schematic of a non-resonant microwave dryer 30 with a control circuit 40 in accordance with this invention. The microwave dryer 30 includes a typical applicator 31 through which the sheet or web 32 is driven by means of a drive 33. The drive 33 is usually set to move the sheet 32 through the applicator at a predetermined rate which may vary. The rate or speed at which the sheet 32 moves is measured by a tachometer 34. The applicator 31 is energized by a microwave source 35 via an input waveguide 36i which includes a 60 dB coupler 37 for tapping off a small amount of the input power from the source 35. The excess energy not spent in the applicator 31 is dumped into a water load 38 via an output waveguide 36o which also includes a 60 dB coupler 39 for tapping off a small amount of power.

The control circuit 40 utilizes the speed information from tachometer 34 and the power information from couplers 37 and 39 to control the input power fed to the applicator 31 from source 35. Monitors 41 and 42 are connected to couplers 37 and 39 respectively and provide output voltages $P_{in_1}$ and $P_{out_1}$ proportional to the actual input power and output power of applicator 31. A divider circuit 43 is connected to monitors 41 and 42 and provides an output voltage $P_{out_1}/P_{in_1}$ which is related to the actual efficiency $\eta$ of the dryer 30 which is defined by $$\eta_1 = 1 - P_{out_1}/P_{in_1}$$

The output from divider 43 is coupled to an input of an adding circuit 44. The other input of adder 44 is coupled to a variable reference voltage source 45 which provides a negative voltage $-\eta_0$ for establishing initial conditions to be described later. The output from adder 44 is amplified by a control amplifier 46 having a gain $-K$ to provide an output signal $-K(\eta_1-\eta_0)$. Finally a second adder 47 has one input coupled to monitor 41 to receive the voltage $P_{in_1}$, a second input coupled to amplifier 46 and a third input upon which is imposed a voltage $-P_{in_0}$ for establishing initial conditions as mentioned above. If the rate of sheet drive is constant, the voltage $-P_{in_0}$ may be provided to adder 47 by a variable reference source 48 (shown in dotted lines) which is set at a predetermined level for certain operating conditions. However, if the rate of sheet drive varies during processing it is preferred that the voltage $-P_{in_0}$ be established under the control of the tachometer 34. Thus the tachometer output is coupled to an amplifier 49 of variable gain S which produces an output signal $-P_{in_0}$ that is proportional to the transport speed. The output from adder 47 is connected to microwave source 35 such that the output signal $P_{in_1} - [P_{in_0} + K(\eta_1 - \eta_0)]$ is used to control the power source 35.

The reference conditions, or the conditions under which the microwave applicator would normally operate are dependent on the applicator used, the normal input moisture of the product, the desired output moisture of the product and the transport speed. Once these have been established, the control circuit parameters, $\eta_0$, K and $P_{in}$ or S may be set. In operation, source 35 is set such that at a predetermined transport speed and normal input moisture, the desired output moisture of the product is obtained with the output of adder 47 disconnected from source 35. Adder 44 receives a particular value for $\eta_1$ and reference source 45 is adjusted such that the output $(\eta_1 - \eta_0)$ for adder 44 is equal to zero. Adder 47 receives a signal $P_{in}$ from monitor 41, a zero signal from amplifier 46 and reference source 48 or amplifier 49 are adjusted such that the output $(P_{in_1} - [P_{in_0} + K(\eta_1 - \eta_0)])$ of adder 47 is also equal to zero. The reference conditions are thus set for the particular product and transport speed, and the output of adder may be connected to the source 35. The parameter K is fixed for a particular applicator and product to be processed. It controls the change in input power required for a change in efficiency caused by the change in input moisture i.e. $K = \Delta Pin_1/\Delta \eta_1$. K may be established from equation 1 to 3 for any particular product; from constant input power, constant efficiency curves for the product; or by adjusting amplifier 46 for a particular product in the following manner. The input moisture content is first adjusted to be close to its minimum expected level. This results in an immediate decrease in efficiency of the applicator 31 and produces a signal at the output of the adder 44. The resulting change in the control signal tends to reduce the input power $P_{in_1}$. The gain K controls the amount by which the input power $P_{in_1}$ is reduced and is adjusted to produce the desired output moisture content. It may be assumed that the curves A and C of FIG. 2 are approximately linear in the range of operation, and therefore the gain K may be maintained constant for the whole range of input moisture contents. A check may be made by setting highest expected input moisture level and making minor adjustments if necessary. With K set, the control system will automatically compensate for large variations in input moisture content. The control system in accordance with this invention was utilized with a dryer having a 26 pass meander line applicator supplied by a 30 Kw 2450 MHz source to process 15" (17.5 lb) Kraft paper. The results are illustrated in FIG. 4 for three transport speeds. Curve A - 25 ft/min., curve B - 39.4 ft/min. and curve C - 69 ft/min. show that the output moisture content was maintained at 11 ± 1% for an input moisture variation between 15–53% utilizing the control circuit in accordance with the invention. Without the control circuit, i.e. maintaining the input power constant at a constant transport speed of 25 ft/min., curve D shows that for the same dryer, the output moisture content increased with input moisture content.

We claim:

1. A control system for a microwave dryer having an applicator for applying microwave energy to a load transported through said applicator and a controlled microwave source for feeding the applicator comprising:
    first means for monitoring the input power to said applicator and providing an output signal $P_{in_1}$;
    second means for monitoring the output power from said applicator and providing an output signal $P_{out_1}$; and
    third means connected between said first and second means and said microwave source to control the input power to said applicator as a function of change in the input power $P_{in}$ and in efficiency $\eta_1$, where $$\eta_1 = 1 - P_{out_1}/P_{in_1}$$

2. A control system as claimed in claim 1 wherein said third means includes:
    first circuit means coupled to said first means and said second means for providing an output signal $K(\eta_1-\eta_0)$ where $\eta_0$ is the efficiency for a reference condition and K is a predetermined constant; and
    second circuit means coupled to said first circuit means and said first monitoring means for providing a control signal $P_{in_1} - [P_{in_0} + K(\eta_1-\eta_0)]$ to said microwave source, where $P_{in_0}$ is a signal representing the applicator input power for a reference condition.

3. A control system as claimed in claim 2 wherein said second circuit means includes tachometer means for monitoring the transport speed of the load through said applicator, said tachometer means generating a signal $-P_{in_0}$ as a function of transport speed.

4. A control system as claimed in claim 2 wherein said first circuit means includes:
    divider means having a first input coupled to said first monitoring means, and a second input coupler to said second monitoring means for providing an output $\eta_1$;

a first reference voltage source for generating $\eta_0$; first adder means having a first input coupled to said divider means and a second input coupled to said first reference source for providing an output $(\eta_1-\eta_0)$; and amplifier means coupled to said first adder means for providing an output $-K(\eta_1-\eta_0)$.

5. A control system as claimed in claim 3 wherein said second circuit means includes:

second reference voltage means for generating $-P_{in_0}$; and second adder means having a first input coupled to said first monitoring means, a second input coupled to said amplifier means and a third input coupled to said second reference voltage means, the output of said second adder means being connected to said microwave source to provide a control signal to said microwave source.

6. A control system as claimed in claim 5 wherein said second reference voltage means includes:

tachometer means for monitoring the transport speed of the load through the applicator, said tachometer means generating a signal $-P_{in_0}$ as a function of transport speed.

* * * * *